(12) United States Patent
Watanobe et al.

(10) Patent No.: US 11,680,022 B2
(45) Date of Patent: Jun. 20, 2023

(54) COMPOSITE SINTERED MATERIAL

(71) Applicants: Sumitomo Electric Industries, Ltd., Osaka (JP); SUMITOMO ELECTRIC HARDMETAL CORP., Itami (JP)

(72) Inventors: Naoki Watanobe, Osaka (JP); Takashi Harada, Osaka (JP); Katsumi Okamura, Osaka (JP); Akito Ishii, Osaka (JP); Satoru Kukino, Itami (JP); Taisuke Higashi, Itami (JP)

(73) Assignees: Sumitomo Electric Industries, Ltd., Osaka (JP); Sumitomo Electric Hardmetal Corp., Itami (JP)

( * ) Notice: Subject to any disclaimer, the term of this patent is extended or adjusted under 35 U.S.C. 154(b) by 736 days.

(21) Appl. No.: 16/604,729

(22) PCT Filed: Jun. 6, 2018

(86) PCT No.: PCT/JP2018/021766
§ 371 (c)(1),
(2) Date: Oct. 11, 2019

(87) PCT Pub. No.: WO2019/039037
PCT Pub. Date: Feb. 28, 2019

(65) Prior Publication Data
US 2020/0102252 A1    Apr. 2, 2020

(30) Foreign Application Priority Data
Aug. 24, 2017   (JP) .............................. JP2017-161349

(51) Int. Cl.
C04B 35/528     (2006.01)
C04B 35/583     (2006.01)
C22C 26/00      (2006.01)

(52) U.S. Cl.
CPC .......... *C04B 35/528* (2013.01); *C04B 35/583* (2013.01); *C22C 26/00* (2013.01);
(Continued)

(58) Field of Classification Search
CPC ............................. C04B 35/528; C22C 26/00
(Continued)

(56) References Cited

U.S. PATENT DOCUMENTS

2008/0214383 A1   9/2008   Matsukawa et al.
2008/0254282 A1  10/2008   Kukino et al.

FOREIGN PATENT DOCUMENTS

JP    S56-073668 A    6/1981
JP    H01-017836 A    1/1989
(Continued)

*Primary Examiner* — Weiping Zhu
(74) *Attorney, Agent, or Firm* — McCarter & English, LLP; Michael A. Sartori

(57) ABSTRACT

A composite sintered material includes a plurality of diamond grains, a plurality of cubic boron nitride grains, and a remainder of a binder phase, wherein the binder phase includes cobalt, a content of the cubic boron nitride grains in the composite sintered material is more than or equal to 3 volume % and less than or equal to 40 volume %, and an average length of line segments extending across continuous cubic boron nitride grains in appropriately specified straight lines extending through the composite sintered material is less than or equal to a length three times as large as an average grain size of the cubic boron nitride grains.

6 Claims, 1 Drawing Sheet

(52) U.S. Cl.
CPC .. *C04B 2235/386* (2013.01); *C04B 2235/427* (2013.01); *C04B 2235/781* (2013.01)

(58) Field of Classification Search
USPC .......................................................... 75/244
See application file for complete search history.

(56) References Cited

FOREIGN PATENT DOCUMENTS

| | | | | |
|---|---|---|---|---|
| JP | 05132704 | A | * | 5/1993 |
| JP | H05-132704 | A | | 5/1993 |
| JP | H09-316587 | A | | 12/1997 |
| JP | 2005-239472 | A | | 9/2005 |
| JP | 2014-531967 | A | | 12/2014 |
| WO | 2005/066381 | A1 | | 7/2005 |
| WO | 2007/039955 | A1 | | 4/2007 |
| WO | 2013/028821 | A1 | | 2/2013 |

* cited by examiner

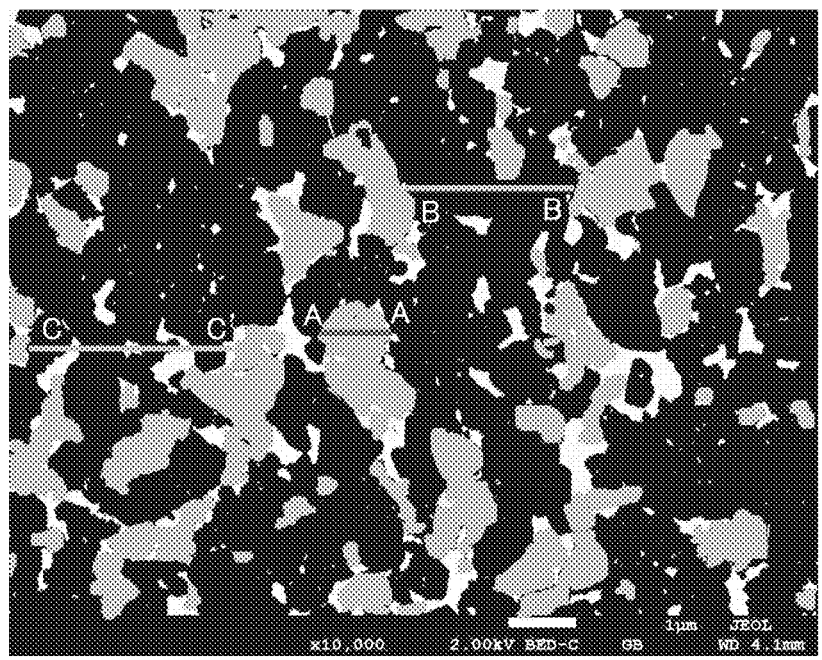

COMPOSITE SINTERED MATERIAL

TECHNICAL FIELD

The present invention relates to a composite sintered material. The present application claims a priority based on Japanese Patent Application No. 2017-161349 filed on Aug. 24, 2017, the entire content of which is incorporated herein by reference.

BACKGROUND ART

Japanese Patent Laying-Open No. 2005-239472 (Patent Literature 1) discloses a high-strength and high-wear-resistance diamond sintered material including: sintered diamond grains having an average grain size of less than or equal to 2 μm; and a remainder of a binder phase, wherein a content of the sintered diamond grains in the diamond sintered material is more than or equal to 80 volume % and less than or equal to 98 volume %, the binder phase includes cobalt and at least one element selected from a group consisting of titanium, zirconium, hafnium, vanadium, niobium, tantalum, chromium, and molybdenum, a content of the at least one element in the binder phase being more than or equal to 0.5 mass % and less than 50 mass %, a content of the cobalt in the binder phase being more than or equal to 50 mass % and less than 99.5 mass %, a part or whole of the at least one element selected from the group consisting of titanium, zirconium, hafnium, vanadium, niobium, tantalum, chromium, and molybdenum is present as carbide grains having an average grain size of less than or equal to 0.8 μm, a carbide grain structure is discontinuous, and adjacent sintered diamond grains are bound to one another.

Japanese Patent Laying-Open No. 9-316587 (Patent Literature 2) discloses a high-strength fine-grain diamond sintered material including: sintered diamond grains; and a remainder of a binder, wherein each of the sintered diamond grains has a grain size falling within a range of 0.1 to 4 μm, the binder includes at least one iron group metal selected from a group consisting of Fe, Co, and Ni, and an oxygen content falls within a range of 0.01 to 0.08 weight %.

Japanese Patent Laying-Open No. 1-17836 (Patent Literature 3) discloses a diamond sintered material constituted of a sintered material obtained by sintering diamond raw material powder particles under a ultra-high pressure and a high temperature, each of the diamond raw material powder particles being uniformly coated with 6 to 0.1 volume % of a group 4a, 5a, or 6a transition metal in the periodic table, boron, or silicon, wherein the diamond sintered material contains 94 to 99.8 volume % of diamond and a remainder of a carbide of the coating material.

Japanese National Patent Publication No. 2014-531967 (Patent Literature 4) discloses a polycrystalline diamond compact comprising: a polycrystalline diamond body comprising a material microstructure comprising a plurality of bonded-together, diamond grains and interstitial regions between the diamond grains; a substrate comprising tungsten and a catalyst metal; and a grain growth inhibitor layer between the polycrystalline diamond body and the substrate, the grain growth inhibitor layer comprising a plurality of titanium-containing particles interspersed with tungsten and the catalyst metal, wherein the titanium-containing particles are less than 800 nanometers in size, wherein the grain growth inhibitor layer is bonded to the substrate and to the polycrystalline diamond body at opposite sides, and is about 20-100 microns in thickness, and wherein the diamond grains have an average size of about 1 micron or less.

WO 2007/039955 (Patent Literature 5) discloses a cBN sintered body for high surface integrity machining, comprising not less than 60% and not more than 95% of cBN (cubic boron nitride) component in volume %, having a thermal conductivity of 70 $W \cdot m^{-1} \cdot K^{-1}$ or more, and an outermost surface of the cBN sintered body being coated with a heat resistant film having a thickness of 0.5 to 12 μm and comprising a compound of at least one element selected from 4a, 5a, 6a group elements and Al, and at least one element selected from C, N and O.

WO 2005/066381 (Patent Literature 6) discloses a cubic boron nitride sintered body, which contains cubic boron nitride particles and a bonding material used for bonding the cBN particles to one another, comprising: cBN particles in a range from 70 vol % to 98 vol %; and a residual bonding material constituted by a Co compound, an Al compound and WC and a solid solution of these, wherein the cBN particles in the sintered body contain 0.03 wt % or less of Mg and 0.001 wt % or more to 0.05 wt % or less of Li.

CITATION LIST

Patent Literature

PTL1: Japanese Patent Laying-Open No. 2005-239472
PTL2: Japanese Patent Laying-Open No. 9-316587
PTL3: Japanese Patent Laying-Open No. 1-17836
PTL4: Japanese National Patent Publication No. 2014-531967
PTL5: WO 2007/039955
PTL6: WO 2005/066381

SUMMARY OF INVENTION

A composite sintered material of the present disclosure includes a plurality of diamond grains, a plurality of cubic boron nitride grains, and a remainder of a binder phase, wherein the binder phase includes cobalt, a content of the cubic boron nitride grains in the composite sintered material is more than or equal to 3 volume % and less than or equal to 40 volume %, and an average length of line segments extending across continuous cubic boron nitride grains in appropriately specified straight lines extending through the composite sintered material is less than or equal to a length three times as large as an average grain size of the cubic boron nitride grains.

BRIEF DESCRIPTION OF DRAWINGS

FIG. 1 is a diagram showing an exemplary electron microscope photograph of a certain cross section of a composite sintered material according to one embodiment of the present invention.

DETAILED DESCRIPTION

Problems to be Solved by the Present Disclosure

In response to an increased airplane demand in recent years, it has been desired to process, at a high speed, a turbine disc and a blisk, which are main components of a jet engine and are composed of a heat-resistant alloy represented by Inconel 718 (Ni group alloy) or Ti-6Al-4V; however, currently, finish processing is performed using a carbide tool at a low cutting speed of about 50 m/min. Thus, there is no tool that satisfies the market need for the high-speed processing.

In each of the diamond sintered materials disclosed in Japanese Patent Laying-Open No. 2005-239472 (Patent Literature 1), Japanese Patent Laying-Open No. 9-316587 (Patent Literature 2), Japanese Patent Laying-Open No. 1-17836 (Patent Literature 3), and Japanese National Patent Publication No. 2014-531967 (Patent Literature 4), the main component, diamond, has a very high affinity to an alloy including an iron group element (group 8, 9 and 10 elements of period 4 in the periodic table, i.e., a general term of three elements of iron, cobalt, and nickel; the same applies to the description below) and/or titanium, is therefore highly reactive, starts to be carbonized at more than or equal to 600° C. in air to have a decreased hardness, and is burned at more than or equal to 800° C. in air. Hence, each of the diamond sintered materials is inferior in thermal stability. For this reason, it is commonly known that each of such diamond sintered materials is not used for high-speed processing of a heat-resistant alloy including an iron group element and/or titanium.

In each of the cubic boron nitride (cBN) sintered bodies disclosed in WO 2007/039955 (Patent Literature 5) and WO 2005/066381 (Patent Literature 6), the main component, cBN, has a low affinity to an alloy including an iron group element and/or titanium. Each of the cubic boron nitride (cBN) sintered bodies exhibits high wear resistance even in high-speed processing of a heat-resistant alloy composed of an alloy including an iron group element and/or titanium. However, since breakage resistance of each of the cBN sintered bodies is low, chipping occurs at an early stage in the high-speed processing of the heat-resistant alloy including an iron group element and/or titanium, thus failing to attain a practical tool life as a tool.

In order to solve the above-described problem, it is an object to provide a composite sintered material that is applicable also to high-speed processing of a heat-resistant alloy including an iron group element and/or titanium and that has both high wear resistance and high breakage resistance.

Advantageous Effect of the Present Disclosure

According to the present disclosure, there can be provided a composite sintered material that is applicable also to high-speed processing of a heat-resistant alloy including an iron group element and/or titanium and that has both high wear resistance and high breakage resistance.

DESCRIPTION OF EMBODIMENTS

First, embodiments of the present invention are listed and described.

[1] A composite sintered material according to one embodiment of the present invention includes a plurality of diamond grains, a plurality of cubic boron nitride grains, and a remainder of a binder phase, wherein the binder phase includes cobalt, a content of the cubic boron nitride grains in the composite sintered material is more than or equal to 3 volume % and less than or equal to 40 volume %, and an average length of line segments extending across continuous cubic boron nitride grains in appropriately specified straight lines extending through the composite sintered material is less than or equal to a length three times as large as an average grain size of the cubic boron nitride grains. In the composite sintered material of the present embodiment, breakage resistance is improved by a skeleton structure constituted of the diamond grains and the binder phase including cobalt, and wear resistance is improved by the cubic boron nitride grains dispersed in this skeleton structure. Hence, the composite sintered material of the present embodiment has high wear resistance and high breakage resistance.

[2] In the composite sintered material of the present embodiment, an average length of line segments extending across the diamond grains or across the diamond grains and the binder phase adjacent to the diamond grains in the appropriately specified straight lines extending through the composite sintered material can be more than or equal to 0.3 μm and less than or equal to 5 μm. Since the average of the sizes of the regions of the diamond grains or the diamond grains and the binder phase adjacent to the diamond grains falls within the predetermined range, the composite sintered material has high wear resistance and high breakage resistance.

[3] In the composite sintered material of the present embodiment, a standard deviation of lengths of line segments extending across the diamond grains or across the diamond grains and the binder phase adjacent to the diamond grains in the appropriately specified straight lines extending through the composite sintered material can be less than or equal to 3.0 μm. Since the standard deviation of the thicknesses of the regions of the diamond grains or the diamond grains and the binder phase adjacent to the diamond grains is small, in other words, since the cubic boron nitride grains are dispersed uniformly among the diamond grains or the diamond grains and the binder phase adjacent to the diamond grains, the composite sintered material has high wear resistance and high breakage resistance.

[4] In the composite sintered material of the present embodiment, the average grain size of the cubic boron nitride grains can be more than or equal to 0.2 μm and less than or equal to 2 μm. Since the average grain size of the cubic boron nitride grains falls within the predetermined range, the composite sintered material is likely to have high wear resistance and high breakage resistance.

[5] In the composite sintered material of the present embodiment, an average grain size of the diamond grains can be more than or equal to 0.5 μm and less than or equal to 5 μm. Since the average grain size of the diamond grains falls within the predetermined range, the composite sintered material has particularly high breakage resistance.

[6] A composite sintered material of the present embodiment includes a plurality of diamond grains, a plurality of cubic boron nitride grains, and a remainder of a binder phase, wherein the binder phase includes cobalt, a content of the cubic boron nitride grains in the composite sintered material is more than or equal to 3 volume % and less than or equal to 40 volume %, an average length of line segments extending across continuous cubic boron nitride grains in appropriately specified straight lines extending through the composite sintered material is less than or equal to a length three times as large as an average grain size of the cubic boron nitride grains, an average length of line segments extending across the diamond grains or across the diamond grains and the binder phase adjacent to the diamond grains in the appropriately specified straight lines extending through the composite sintered material can be more than or equal to 0.3 μm and less than or equal to 5 μm, and a standard deviation of the line segments extending across the diamond grains or across the diamond grains and the binder phase adjacent to the diamond grains in the appropriately specified straight lines extending through the composite sintered material can be less than or equal to 3.0 μm, the average grain size of the cubic boron nitride grains can be more than or equal to 0.2 μm and less than or equal to 2 μm, and an average grain size of the diamond grains can be more than or equal to 0.5 μm and less than or equal to 5 μm. The composite sintered material has high wear resistance and high breakage resistance.

DETAILS OF EMBODIMENTS OF THE PRESENT INVENTION

Composite Sintered Material

A composite sintered material of the present embodiment includes a plurality of diamond grains, a plurality of cubic boron nitride (cBN) grains, and a remainder of a binder phase, wherein the binder phase includes cobalt, a content of the cBN grains in the composite sintered material is more than or equal to 3 volume % and less than or equal to 40 volume %, and an average length of line segments extending across continuous cBN grains in appropriately specified straight lines extending through the composite sintered material is less than or equal to a length three times as large as an average grain size of the cBN grains. In the composite sintered material of the present embodiment, breakage resistance is improved by a skeleton structure constituted of the diamond grains and the binder phase including cobalt, and wear resistance is improved by the cBN grains dispersed in this skeleton structure. Hence, the composite sintered material of the present embodiment has high wear resistance and high breakage resistance.

The present inventors used a cBN sintered material to form an end mill, which is one type of cutting tool. The present inventors found that when the end mill just before a cutting edge thereof was chipped was observed during processing of a heat-resistant alloy (for example, Inconel (registered trademark) 718) including an iron group element, a crack generated inside the end mill extended through a cBN grain in the cutting edge. Accordingly, it was found that toughness and strength of the cBN grains are insufficient for a tool for processing a heat-resistant alloy including an iron group element and/or titanium, and the performance thereof is not expected to be greatly improved by continuously modifying the cBN sintered material in the conventional manner.

Next, the present inventors formed an end mill using a diamond sintered material, which is not used normally, because it was considered that a cutting distance per cutting edge was short and a temperature of the cutting edge was less likely to be increased in high-speed processing of a heat-resistant alloy including an iron group element and/or titanium by the end mill. Then, the present inventors processed a heat-resistant alloy (for example, Inconel (registered trademark) 718) including an iron group element. As a result, chipping, which frequently occurs in the end mill formed using the cBN sintered material, did not occur in the end mill formed using the diamond sintered material; however, a wear rate of the end mill formed using the diamond sintered material is higher than that of the end mill formed using the cBN sintered material, with the result that a practical tool life was not obtained.

To address this, the present inventors considered to combine cBN grains excellent in wear resistance with diamond grains excellent in breakage resistance. As a result, a composite sintered material having significantly improved wear resistance while maintaining breakage resistance provided by diamond grains in an actual end mill process was successfully obtained by dispersing and uniformly disposing cBN grains as much as possible in a sintered material including diamond grains and a binder.

Diamond Grains

The average grain size of the diamond grains is preferably more than or equal to 0.5 μm and less than or equal to 5 μm and is more preferably more than or equal to 0.8 μm and less than or equal to 2 μm in order to obtain a composite sintered material having both high wear resistance and high breakage resistance, particularly, having a high breakage resistance. Here, the average grain size of the diamond grains is determined in the following manner: an appropriately specified cross section of the composite sintered material is produced through a CP process employing a cross section polisher (CP) apparatus or the like; the diamond grains are identified in the cross section through EDX (energy dispersive X-ray spectroscopy); and assuming that the diamond grains are dispersed homogeneously in the composite sintered material, equivalent circle diameters and average of the grains are calculated using image analysis software based on the cross sectional area of each grain. Here, the number n of samples of the diamond grains for calculating the average is 50.

The content of the diamond grains in the composite sintered material is preferably more than or equal to 30 volume % and less than or equal to 94 volume %, and is more preferably more than or equal to 50 volume % and less than or equal to 70 volume % in view of suitability for forming a skeleton structure constituted of at least parts of the diamond grains which are bound to one another and are continuous. Here, the content of the diamond grains in the composite sintered material is calculated in the following manner: in the appropriately specified cross section of the composite sintered material, the diamond grains are identified by EDX (energy dispersive X-ray spectroscopy); and assuming that the diamond grains are dispersed homogeneously in the composite sintered material, an area % of a cross sectional area of the diamond grains with respect to the total area of the cross section is regarded as a volume %.

Cubic Boron Nitride Grains

The average grain size of the cBN (cubic boron nitride) grains is preferably more than or equal to 0.2 μm and less than or equal to 2 μm and is more preferably more than or equal to 0.5 μm and less than or equal to 1 μm in order to obtain a composite sintered material having both high wear resistance and high breakage resistance. Here, as with the case of the diamond grains, the average grain size of the cBN grains is determined in the following manner: an appropriately specified cross section of the composite sintered material is produced through a CP process employing a cross section polisher (CP) apparatus or the like; the diamond grains are identified in the cross section through EDX (energy dispersive X-ray spectroscopy); and assuming that the diamond grains are dispersed homogeneously in the composite sintered material, equivalent circle diameters and average of the grains are calculated using image analysis software based on the cross sectional area of each grain. Here, the number n of samples of the cBN grains for calculating the average is 50.

The content of the cBN grains in the composite sintered material is more than or equal to 3 volume % and less than or equal to 40 volume % and is more preferably more than or equal to 10 volume % and less than or equal to 30 volume % in view of suitability for dispersing the cBN grains among the diamond grains or the diamond grains and the binder phase and in order to obtain a composite sintered material having an excellent balance of high wear resistance and high durability. Here, the content of the cBN grains in the composite sintered material is calculated in the following manner: in the appropriately specified cross section of the composite sintered material, the cBN grains are identified by EDX (energy dispersive X-ray spectroscopy); and assuming that the cBN grains are dispersed homogeneously in the composite sintered material, an area % of a cross sectional area of the cBN grains with respect to the total area of the cross section is regarded as a volume %.

In the appropriately specified cross section of the composite sintered material, an average length of line segments extending across continuous cBN grains in appropriately specified straight lines extending through the composite sintered material is less than or equal to a length three times as large as the average grain size of the cBN grains, and is preferably less than or equal to the length as large as the average grain size of the cBN grains in order to obtain a composite sintered material having high wear resistance and high breakage resistance. Here, an exemplary line segment extending across continuous cBN grains in an appropriately specified straight line extending through the composite sintered material is represented by a line segment A-A' in a certain cross section of the composite sintered material as shown in FIG. 1. In FIG. 1, there are black, gray, and white portions, and the gray portion represents a portion of the cBN grains.

In a composite sintered material, a skeleton structure constituted of diamond grains can be formed by a binder phase including Co and exhibits strong bonding strength; however, bonding strength is weak between cBN grains or between the cBN grains and the binder phase including Co. Therefore, when cBN grain aggregates (for example, cBN grain aggregates each of which is constituted of aggregated nine cBN grains having an average grain size of X μm and each of which has a side larger than 3X μm) are scattered, portions of the sintered material with the cBN grain aggregates have weak strength, thus resulting in a short life due to sudden breakage in a test under load such as intermittent cutting. In view of this, high breakage resistance and high wear resistance are attained in a composite sintered material in which an average grain size of cBN grains is X μm and in which an average length of line segments extending across continuous cBN grains in appropriately specified straight lines extending through the composite sintered material is less than or equal to 3X μm (i.e., a length three times as large as the average grain size of the cBN grains). Further, a composite sintered material in which an average grain size of cBN grains is X μm and in which an average length of line segments extending across continuous cBN grains in appropriately specified straight lines extending through the composite sintered material is less than or equal to X μm (i.e., the length as large as the average grain size of the cBN grains) is in a state close to such a state that individual cBN grains are dispersed. This is preferable because breakage resistance becomes higher.

In the appropriately specified cross section of the composite sintered material, the average length of the line segments extending across the diamond grains or across the diamond grains and the binder phase adjacent to the diamond grains in the appropriately specified straight lines extending through the composite sintered material is preferably more than or equal to 0.3 μm and less than or equal to 5 μm, and is more preferably more than or equal to 0.3 μm and less than or equal to 3 μm in order to obtain a composite sintered material having high wear resistance and high breakage resistance. Both high breakage resistance and high wear resistance are attained when the average (corresponding to the average length of the line segments) of sizes of the regions that are constituted of the diamond grains or the diamond grains and the binder phase adjacent to the diamond grains and that are divided by the cBN grains falls within the range of more than or equal to 0.3 μm and less than or equal to 5 μm in the composite sintered material. When the average of the sizes of the regions of the diamond grains and the binder phase adjacent to the diamond grains is more than or equal to 0.3 μm, strength in the minute regions becomes sufficient, whereby the composite sintered material has sufficient strength as a whole. On the other hand, when the regions of the diamond grains and the binder phase adjacent to the diamond grains become too large, a multiplicity of regions have less wear resistance, with the result that the wear resistance is decreased.

The average of the sizes of the regions of the diamond grains or the diamond grains and the binder phase adjacent to the diamond grains is determined by: amounts of the diamond grains and the binder phase; a degree of aggregation of the diamond grains and the binder phase; and the number of cBN grain aggregates that divide the diamond grains and the binder phase. When the average of the sizes of the diamond grains and the binder phase adjacent to the diamond grains is too small, the strength provided by the skeleton structure constituted of the diamond grains cannot be maintained to result in a short life. Hence, the average thereof needs to be more than or equal to 0.3 μm. On the other hand, when the average of the sizes of the diamond grains and the binder phase adjacent to the diamond grains is more than or equal to 5 μm, a multiplicity of minute regions having small wear resistance leads to the result that chipping is likely to occur due to a level difference in the worn surface. This leads to a shorter life than that in a case where the sintered material is worn smoothly.

In the appropriately specified cross section of the composite sintered material, the standard deviation of the lengths of the line segments extending across the diamond grains or across the diamond grains and the binder phase adjacent to the diamond grains in the appropriately specified straight lines extending through the composite sintered material is preferably less than or equal to 3.0 μm and is more preferably less than or equal to 2.0 μm in order to obtain a composite sintered material having high wear resistance and high breakage resistance. Here, an exemplary line segment extending across diamond grains in an appropriately specified straight line extending through the composite sintered material is represented by a line segment B-B' in the certain cross section of the composite sintered material as shown in FIG. 1. An exemplary line segment extending across the continuous diamond grains and the binder phase adjacent to the diamond grains in an appropriately specified straight line extending through the composite sintered material is represented by a line segment C-C' in the certain cross section of the composite sintered material as shown in FIG. 1. In FIG. 1, there are the black, gray, and white portions. The black portion represents the portion of the diamond grains, and the white portion represents the portion of the binder phase.

The standard deviation (variation) of the sizes (corresponding to the lengths of the line segments) of the regions of the diamond grains or the diamond grains and the binder phase adjacent to the diamond grains is determined by a degree of dispersion of the cBN grain aggregates in the regions of the diamond grains or the diamond grains and the binder phase adjacent to the diamond grains. A smaller standard deviation of the sizes of the regions of the diamond grains or the diamond grains and the binder phase adjacent to the diamond grains means that the cBN grains are more uniformly dispersed in the regions of the diamond grains or the diamond grains and the binder phase adjacent to the diamond grains.

Binder Phase

The binder phase includes Co (cobalt) in order to bind at least parts of adjacent diamond grains to one another. The content of Co in the composite sintered material is preferably more than or equal to 3 volume % and less than or equal to 30 volume %, and is more preferably more than or equal to 10 volume % and less than or equal to 20 volume % in order to bind at least parts of adjacent diamond grains to one another. Here, the content of Co in the composite sintered material is calculated in the following manner: in the appropriately specified cross section of the composite sintered material, Co is identified by EDX (energy dispersive X-ray spectroscopy); and assuming that Co is dispersed homogeneously in the composite sintered material, an area % of a cross sectional area specified as Co with respect to the total area of the cross section is regarded as a volume %.

In order to increase the strength of the composite sintered material, the binder phase preferably further includes a chemical component including at least one element selected from a group consisting of W (tungsten), Ti (titanium), Zr (zirconium), Hf (hafnium), Nb (niobium), Ta (tantalum), Cr (chromium), Al (aluminum), Si (silicon), Ni (nickel) and molybdenum (Mo). In order to increase the strength of the composite sintered material by binding at least parts of adjacent diamond grains to one another, the content of Co in the binder phase is preferably more than or equal to 50 mass % and less than or equal to 99.5 mass %, and is more preferably more than or equal to 55 mass % and less than or equal to 70 mass %. Moreover, in order to increase the strength of the composite sintered material, the content of the above-described chemical component (chemical component including at least one element selected from the group consisting of W, Ti, Zr, Hf, Nb, Ta, Cr, Al, Si, Ni and Mo) in the binder phase is preferably more than or equal to 0.5 mass % and less than or equal to 50 mass %, and is more preferably more than or equal to 30 mass % and less than or equal to 45 mass %. The respective contents of Co and the chemical component in the binder phase are calculated by performing the CP process onto the appropriately specified cross section of the composite sintered material and determining a mass ratio of Co and the chemical component measured through a quantitative analysis in EDX (energy dispersive X-ray spectroscopy).

In order to increase the wear resistance of the composite sintered material, at least a part of the above-described chemical component (chemical component including at least one element selected from the group consisting of W, Ti, Zr, Hf, Nb, Ta, Cr, Al, Si, Ni and Mo) included in the binder phase is preferably at least one of a carbide, a carbonitride, a nitride, an oxide, a boride, and an oxynitride. Examples thereof include: a carbide such as TiC; a carbonitride such as TiCN; a nitride such as TiN; an oxide such as $Al_2O_3$; a boride such as $TiB_2$; and an oxynitride such as sialon (SiAlON). The type of the chemical component is identified in accordance with a diffraction peak pattern of XRD (X-ray diffraction).

The composite sintered material of the present embodiment is a composite sintered material including a plurality of diamond grains, a plurality of cubic boron nitride grains, and a remainder of a binder phase, wherein the binder phase includes cobalt, a content of the cubic boron nitride grains in the composite sintered material is more than or equal to 3 volume % and less than or equal to 40 volume %, an average length of line segments extending across continuous cubic boron nitride grains in appropriately specified straight lines extending through the composite sintered material is less than or equal to a length three times as large as an average grain size of the cubic boron nitride grains, an average length of line segments extending across the diamond grains or across the diamond grains and the binder phase adjacent to the diamond grains in the appropriately specified straight lines extending through the composite sintered material is more than or equal to 0.3 μm and less than or equal to 5 μm, and a standard deviation of the line segments extending across the diamond grains or across the diamond grains and the binder phase adjacent to the diamond grains in the appropriately specified straight lines extending through the composite sintered material is less than or equal to 3.0 μm, the average grain size of the cubic boron nitride grains is more than or equal to 0.2 μm and less than or equal to 2 μm, and an average grain size of the diamond grains is more than or equal to 0.5 μm and less than or equal to 5 μm. The composite sintered material has high wear resistance and high breakage resistance.

Method for Manufacturing Composite Sintered Material

Although not particularly limited, in order to manufacture the composite sintered material of the present embodiment efficiently, a method for manufacturing the composite sintered material according to the present embodiment preferably includes: a first step of forming binder-coated diamond powder by coating at least a portion of a surface of each particle of diamond powder with a binder including Co; a second step of preliminarily grinding particles of cBN powder from one another and then forming a mixture by mixing the binder-coated diamond powder with the preliminarily grinded particles of the cBN powder; and a third step of forming the composite sintered material by sintering the mixture.

First Step

In the first step, the binder-coated diamond powder is formed by coating at least a portion of the surface of each particle of the diamond powder with the binder including Co. By sintering the mixture of the binder-coated diamond powder and the cBN powder in the subsequent step, the composite sintered material of the present embodiment is obtained.

The average particle size of the diamond powder used in the first step is not particularly limited, but is preferably more than or equal to 0.5 μm and less than or equal to 5 μm and is more preferably more than or equal to 0.8 μm and less than or equal to 2 μm in order to form a composite sintered material having high strength, high wear resistance and high breakage resistance. A method for coating at least a portion of the surface of each particle of the diamond powder with the binder including Co is not particularly limited, but is preferably an electroless plating method, an arc deposition method, a powder sputtering method, or the like in order to attain a small amount of impurity and uniform coating. In order to form a composite sintered material having high strength, high wear resistance and high breakage resistance, the binder preferably includes not only Co but also a chemical component including at least one element selected from a group consisting of W, Ti, Zr, Hf, Nb, Ta, Cr, Al, Si, Ni and Mo. In the subsequent step, the binder forms the binder phase in the composite sintered material.

In the first step, in order to reduce aggregation of the diamond grains, it is preferable to disperse the particles of the diamond powder by way of the preliminary grinding before coating at least a portion of the surface of each particle of the diamond powder with the binder. That is, the first step preferably includes: a first A sub step of dispersing particles of the diamond powder; and a first B sub step of forming the binder-coated diamond powder by coating at least a portion of the surface of each of the dispersed particles of the diamond powder with the binder including Co. By dispersing each particle of the diamond powder before coating the surface with the binder, the diamond particles are suppressed from being aggregated too much even after mixing the binder-coated diamond powder with the cBN powder and each particle of the diamond powder and the binder exist close to each other, whereby the sizes of the regions of the diamond grains or the diamond grains and the binder phase adjacent to the diamond grains in the composite sintered material can fall within the desired range (for example, more than or equal to 0.3 μm and less than or equal to 5 μm).

The method for dispersing each particle of the diamond powder in the first A sub step is not particularly limited, and methods, such as ultrasonic dispersing and homogenizer dispersing, can be employed. The method for coating at least a portion of the surface of each dispersed particle of the diamond powder with the binder including Co in the first B sub step is the same as the method for coating at least a portion of the surface of each particle of the diamond powder with the binder including Co in the first step.

Second Step

In the second step, the mixture is formed by preliminarily grinding the particles of the cBN powder from one another and then mixing the binder-coated diamond powder with the preliminarily grinded particles of the cBN powder. That is, the second step includes: a second A sub step of preliminarily grinding the particles of the cBN powder from one another; and a second B sub step of mixing the binder-coated diamond powder with the preliminarily grinded particles of the cBN powder. By preliminarily grinding the particles of the cBN powder from one another and then mixing the binder-coated diamond powder with the preliminarily grinded particles of the cBN powder, the cBN grains can be dispersed among the diamond grains and the binder phase without aggregation (such that the average length of the line segments extending across continuous cBN grains is less than or equal to the length three times as large as the average grain size of the cBN grains, for example). By sintering this mixture in the subsequent step, the composite sintered material of the present embodiment is obtained. Moreover, in order to adjust an amount of the binder in the sintered material, the binder can also be added in this step. The first step can be skipped when the binder is added in the second step; however, it is preferable to perform the first step.

The average particle size of the cBN powder used in the second step is not particularly limited, but is preferably less than or equal to 2 μm and is more preferably less than or equal to 1 μm in order to form a composite sintered material having high strength, high wear resistance and high breakage resistance.

A method for preliminarily grinding the particles of the cBN powder from one another in the second A sub step is not particularly limited; however, in order to grind the particles homogeneously and efficiently, grinding by a ball mill, grinding by a jet mill, grinding by a bead mill, grinding by a planetary mill, or the like is preferable. In order to reduce the aggregation of the particles of the cBN powder before mixing with the diamond powder, the particle size of each particle of the cBN powder after the preliminary grinding is preferably less than or equal to 3X μm and is more preferably X μm, where X μm is represented by the average particle size of the particles of the cBN powder. The particle size of each particle of the cBN powder after the preliminary grinding is measured using a particle size distribution measuring instrument such as a microtrac.

A method for mixing the binder-coated diamond powder with the preliminarily grinded particles of the cBN powder in the second B sub step is not particularly limited, but is preferably ball mill mixing, bead mill mixing, planetary mill mixing, jet mill mixing, or the like in order to mix them homogeneously and efficiently. A longer time for mixing with the preliminarily grinded particles of the cBN powder is more preferable in order to disperse the cBN grains uniformly in the regions of the diamond grains or the diamond grains and the binder phase adjacent to the diamond grains. For example, in the case of ball-mill mixing, the time for mixing with the preliminarily grinded particles of the cBN powder is preferably more than or equal to 5 hours, or is preferably more than or equal to 10 hours, or is preferably more than or equal to 20 hours.

Moreover, as described above, the binder can be also mixed on this occasion. By adjusting the amount of the binder-coated diamond powder (that is, the amount of the diamond powder and the amount of the binder relative to the diamond powder), the amount of the cBN powder, and the contents of Co and the chemical component in the binder, it is possible to obtain: a desired content of the diamond grains, a desired content of the cBN grains, and a desired content of Co in the composite sintered material; and a desired content of Co and a desired content of the chemical component in the binder phase.

Third Step

In the third step, the composite sintered material is formed by sintering the mixture. Conditions in sintering the mixture are not particularly limited, but in order to obtain the composite sintered material of the present embodiment efficiently, a sintering pressure is preferably more than or equal to 4 GPa and less than or equal to 10 GPa and is more preferably more than or equal to 6 GPa and less than or equal to 8 GPa, a sintering temperature is preferably more than or equal to 1400° C. and less than or equal to 2000° C. and is more preferably more than or equal to 1500° C. and less than or equal to 1800° C. In order to form the skeleton structure of the diamond grains, a longer sintering time is more preferable. The sintering time is preferably more than or equal to 15 minutes and less than or equal to 60 minutes. Normally, although abnormal grain growth is resulted when fine diamond particles are sintered for a long time under a high-pressure of more than or equal to 6 GPa and a high temperature of more than or equal to 1500° C., the cBN grains are placed in the diamond lattice in the present embodiment to suppress abnormal grain growth, whereby sintering can be performed for a longer time than that in the conventional art.

EXAMPLES

Experiment Example I

In the present example, composite sintered materials were produced to have respective average grain sizes and contents of diamond grains and cBN grains, respective prepared compositions of binders, and respective contents and compositions of binder phases as shown in No. I-1 to No. I-8 of Table 1 and No. I-9 to No. I-16 of Table 2. Cutting tools were produced using these composite sintered materials. Flank face wear widths of cutting edges of the cutting tools were measured when cutting Inconel (registered trademark) 718 at a high speed. Accordingly, respective lives thereof were evaluated.

Each of the composite sintered materials was produced as follows. As the first A sub step of the first step, the particles of each of the diamond powders having the average grain sizes shown in Table 1 and Table 2 were ultrasonically dispersed. This ultrasonic dispersing was performed by introducing the diamond powder into distilled water to attain a slurry concentration of 10 mass % and ultrasonically dispersing the particles of the diamond powder for 15 minutes at a frequency of 40 kHz using an ultrasonic dispersion device (ASU-6 provided by As One Corporation). As the first B sub step of the first step, a surface of each dispersed particle of the diamond powder was coated, by the electroless plating method, with 6 mass % of Co serving as the binder with respect to the diamond particle.

Then, as the second A sub step of the second step, particles of the respective cBN powders having average grain sizes shown in Table 1 and Table 2 were preliminarily grinded from one another under conditions shown in No. I-1 to No. I-8 of Table 1 and No. I-9 to No. I-16 of Table 2. In each of No. I-1 to No. I-4, the particles of the cBN powder were preliminarily grinded using a ball mill. The preliminary grinding was performed under the following conditions: a cemented carbide ball having a diameter of 2 mm, the cBN powder, and acetone were introduced in a pot; and the grinding was performed at 260 rpm for a period of time shown in Table 1. Here, the ratio of the cemented carbide ball was set to 30 volume % with respect to the whole of the cBN powder, the cemented carbide ball, and acetone. In No. I-5, the particles of the cBN powder were not preliminarily grinded and were mixed with the diamond powder. In No. I-6, the content of the cBN grains was changed by changing the prepared amount of the cBN powder. In each of No. I-10 to No. I-16, a binder other than Co was added in addition to Co as the binder or a hard phase other than the cBN grains and the diamond grains was added.

Next, as the 2B sub step of the second step, the Co-coated diamond powder obtained as described above and the cBN powder obtained as described above were wet-mixed with each other using the ball-mill method, thereby producing a mixture. The ball-mill mixing was performed under the following conditions: a cemented carbide ball having a diameter of 3 mm, the Co-coated diamond powder, and cBN powder, and acetone were introduced into a pot; and mixing was performed at 260 rpm for a period of time shown in Table 1 and Table 2. Here, the ratio of the cemented carbide ball was set to 30 volume % with respect to the whole of the Co-coated diamond powder, the cBN powder, the cemented carbide ball, and acetone. Next, in order to remove gas from particle surfaces, vacuum heat treatment was performed at 1200° C. for 30 minutes.

Next, as the third step, the obtained mixture was introduced into a container composed of Ta (tantalum) with the mixture being in contact with a WC-6% Co cemented carbide disc and a Co foil, and was sintered by holding the mixture for 30 minutes at a pressure of 6 GPa and a temperature of 1650° C. using a belt type ultra-high pressure and high temperature generator, thereby producing the composite sintered material.

As a result of the sintering, although the composition of the binder phase in the sintered material was slightly changed from the prepared composition of the mixture, the contents of the diamond grains, cBN grains, and binder phase in the sintered material were substantially the same as the contents of the prepared diamond powder, cBN powder, and binder by designing the prepared composition and introduction configuration in consideration of an amount of infiltration in the sintering.

When the appropriately specified cross section of the produced composite sintered material was polished using an argon ion beam and the structure of the composite sintered material was observed using SEM (scanning electron microscope), a skeleton structure in which at least parts of the diamond grains are bound to and continuous to one another was observed in the case of each of No. I-1 to No. I-16. Moreover, the diamond grains, cBN grains, binder phase, and other components in the composite sintered material were distinguished using EDX (energy dispersive X-ray spectroscopy). Moreover, a SEM (scanning electron microscope) image was captured in a visual field of 5000× and was subjected to a binarization process, thereby distinguishing the cBN grains from the other components. Straight lines were appropriately drawn on the SEM image and the average length of (100 or more) line segments extending across continuous cBN grains was calculated. Moreover, the above-described SEM image was subjected to a binarization process to distinguish the diamond grains and the binder phase from the other components. Then, straight lines were appropriately drawn and the average length and standard deviation of lengths of (100 or more) line segments extending across the diamond grains or across the diamond grains and the binder phase adjacent to the diamond grains were calculated. Results thereof are collectively shown in Table 1 and Table 2.

Each of the produced composite sintered materials was used to produce a cutting tool constituted of: an end mill type cutter of the SRF40R-ST model (cutting diameter of 40 mm); and an insert of the SNEW09T3ADTR-R model. The produced cutting tool was used to cut the upper surface of a workpiece of Inconel (registered trademark) 718 in the form of a disc having an outer diameter of 95 mm (material having been through solution treatment and age-hardening treatment as provided by Daido-Special Metals; Rockwell hardness HRC44; grain size corresponding to grain size number 9 defined in E112 of ASTM (American Society for Testing and Materials)). Cutting conditions were as follows: a cutting speed Vc was 300 m/min; a feed rate f was 0.15 mm/cutting edge; a depth of cut ap was 0.5 mm; a radial depth of cut ae was 0.12 mm; and coolant was WET (20×-diluted emulsion). Results thereof are collectively shown in Table 1 and Table 2. "Life" in Table 1 represents the length of cut of the workpiece when flank wear and/or chipping width became more than 0.1 mm.

TABLE 1

| No. | | I-1 | I-2 | I-3 | I-4 | I-5 |
|---|---|---|---|---|---|---|
| Diamond Grains | Average Grain Size (μm) | 1.0 | 1.0 | 1.0 | 1.0 | 1.0 |
| | Content (Volume %) | 70 | 70 | 70 | 70 | 70 |
| cBN Grains | Average Grain Size (μm) | 1.0 | 1.0 | 1.0 | 1.0 | 1.0 |
| | Content (Volume %) | 15 | 15 | 15 | 15 | 15 |
| Binder | Prepared Composition (Mass %) | Co: 100 | Co: 100 | Co: 100 | Co: 100 | Co: 100 |
| Binder Phase | Content (Volume %) | 15 | 15 | 15 | 15 | 15 |
| Other Grains and Contents (Volume %) | | — | — | — | — | — |
| Whether or Not Diamond Powder was Dispersed before Coating Each Particle with Binder | | Dispersed | Dispersed | Dispersed | Dispersed | Dispersed |
| Whether or Not Each Particle of Diamond Powder was Coated with Binder | | Coated | Coated | Coated | Coated | Coated |
| Whether or Not Particles of cBN Powder were Preliminarily Grinded | | Grinded | Grinded | Grinded | Grinded | Not Grinded |
| Conditions of Preliminary Grinding of Particles of cBN Powder | | Ball Mill 1 hr | Ball Mill 5 hr | Ball Mill 10 hr | Ball Mill 20 hr | — |
| Conditions of Mixing of Diamond Powder and cBN Powder | | Ball Mill 10 hr | Ball Mill 10 hr | Ball Mill 10 hr | Ball Mill 10 hr | Ball Mill 10 hr |
| Average Length (μm) of Line Segments Extending Across Continuous cBN Grains | | 2.8 | 1.5 | 0.8 | 0.5 | 3.5 |
| Average Length (Multiple) of Line Segments Extending Across Continuous cBN Grains with respect to Average Grain Size of cBN Grains | | 2.8 | 1.5 | 0.8 | 0.5 | 3.5 |
| Average Length (μm) of Line Segments Extending Across Diamond Grains or Across Diamond Grains and Adjacent Binder Phase | | 3.5 | 2.6 | 1.8 | 1.5 | 4.5 |
| Standard Deviation (μm) of Lengths of Line Segments Extending Across Diamond Grains or Across Diamond Grains and Adjacent Binder Phase | | 2.5 | 2.2 | 1.4 | 0.8 | 5.6 |
| Life (m) in Cutting Test | | 2.1 | 2.8 | 3.9 | 4.2 | 0.3 |
| Notes | | Example | Example | Example | Example | Comparative Example |

| No. | | I-6 | I-7 | I-8 |
|---|---|---|---|---|
| Diamond Grains | Average Grain Size (μm) | 1.0 | 1.0 | 1.0 |
| | Content (Volume %) | 82 | 35 | 83 |
| cBN Grains | Average Grain Size (μm) | 1.0 | 1.0 | 1.0 |
| | Content (Volume %) | 3 | 40 | 2 |
| Binder | Prepared Composition (Mass %) | Co: 100 | Co: 100 | Co: 100 |
| Binder Phase | Content (Volume %) | 15 | 15 | 15 |
| Other Grains and Contents (Volume %) | | — | — | — |
| Whether or Not Diamond Powder was Dispersed before Coating Each Particle with Binder | | Dispersed | Dispersed | Dispersed |
| Whether or Not Each Particle of Diamond Powder was Coated with Binder | | Coated | Coated | Coated |
| Whether or Not Particles of cBN Powder were Preliminarily Grinded | | Grinded | Grinded | Grinded |
| Conditions of Preliminary Grinding of Particles of cBN Powder | | Ball Mill 10 hr | Ball Mill 10 hr | Ball Mill 10 hr |
| Conditions of Mixing of Diamond Powder and cBN Powder | | Ball Mill 10 hr | Ball Mill 10 hr | Ball Mill 10 hr |
| Average Length (μm) of Line Segments Extending Across Continuous cBN Grains | | 0.4 | 1.7 | 0.6 |
| Average Length (Multiple) of Line Segments Extending Across Continuous cBN Grains with respect to Average Grain Size of cBN Grains | | 0.4 | 1.7 | 0.6 |
| Average Length (μm) of Line Segments Extending Across Diamond Grains or Across Diamond Grains and Adjacent Binder Phase | | 2.8 | 0.4 | 3.0 |
| Standard Deviation (μm) of Lengths of Line Segments Extending Across Diamond Grains or Across Diamond Grains and Adjacent Binder Phase | | 2.1 | 0.3 | 2.8 |
| Life (m) in Cutting Test | | 2.5 | 2.3 | 0.6 |
| Notes | | Example | Example | Comparative Example |

TABLE 2

| No. | | I-9 | I-10 | I-11 | I-12 | I-13 |
|---|---|---|---|---|---|---|
| Diamond Grains | Average Grain Size (μm) | 1.0 | 1.0 | 1.0 | 1.0 | 1.0 |
| | Content (Volume %) | 35 | 75 | 75 | 75 | 61 |
| cBN Grains | Average Grain Size (μm) | 1.0 | 1.0 | 1.0 | 1.0 | 1.0 |
| | Content (Volume %) | 50 | 10 | 10 | 10 | 10 |

TABLE 2-continued

| Binder | Prepared Composition (Mass %) | Co: 100 | Co: 94 W: 6 | Co: 81 W: 14 Cr: 15 | Co: 85 Zr: 15 | Co: 94 W: 6 |
|---|---|---|---|---|---|---|
| Binder Phase | Content (Volume %) | 15 | 15 | 15 | 15 | 15 |
| Other Grains and Contents (Volume %) | | — | — | — | — | WC: 14 |
| Whether or Not Diamond Powder was Dispersed before Coating Each Particle with Binder | | Dispersed | Dispersed | Dispersed | Dispersed | Dispersed |
| Whether or Not Each Particle of Diamond Powder was Coated with Binder | | Coated | Coated | Coated | Coated | Coated |
| Whether or Not Particles of cBN Powder were Preliminarily Grinded | | Grinded | Grinded | Grinded | Grinded | Grinded |
| Conditions of Preliminary Grinding of Particles of cBN Powder | | Ball Mill 10 hr | Ball Mill 10 hr | Ball Mill 10 hr | Ball Mill 10 hr | Ball Mill 10 hr |
| Conditions of Mixing of Diamond Powder and cBN Powder | | Ball Mill 10 hr | Ball Mill 10 hr | Ball Mill 10 hr | Ball Mill 10 hr | Ball Mill 10 hr |
| Average Length (μm) of Line Segments Extending Across Continuous cBN Grains | | 1.8 | 0.9 | 1.0 | 0.9 | 0.6 |
| Average Length (Multiple) of Line Segments Extending Across Continuous cBN Grains with respect to Average Grain Size of cBN Grains | | 1.8 | 0.9 | 1.0 | 0.9 | 0.6 |
| Average Length (μm) of Line Segments Extending Across Diamond Grains or Across Diamond Grains and Adjacent Binder Phase | | 0.5 | 1.7 | 2.2 | 2.1 | 1.5 |
| Standard Deviation (μm) of Lengths of Line Segments Extending Across Diamond Grains or Across Diamond Grains and Adjacent Binder Phase | | 0.3 | 1.3 | 1.8 | 1.6 | 0.9 |
| Life (m) in Cutting Test | | 0.4 | 4.1 | 4.0 | 3.8 | 4.0 |
| Notes | | Comparative Example | Example | Example | Example | Example |

| | No. | I-14 | I-15 | I-16 |
|---|---|---|---|---|
| Diamond Grains | Average Grain Size (μm) | 1.0 | 1.0 | 1.0 |
| | Content (Volume %) | 52 | 70 | 62 |
| cBN Grains | Average Grain Size (μm) | 1.0 | 1.0 | 1.0 |
| | Content (Volume %) | 8 | 10 | 7 |
| Binder | Prepared Composition (Mass %) | Co: 94 W: 6 | Co: 94 W: 6 | Co: 94 W: 6 |
| Binder Phase | Content (Volume %) | 15 | 15 | 15 |
| Other Grains and Contents (Volume %) | | TiC: 25 | $Al_2O_3$: 5 | TiC: 16 |
| Whether or Not Diamond Powder was Dispersed before Coating Each Particle with Binder | | Dispersed | Dispersed | Dispersed |
| Whether or Not Each Particle of Diamond Powder was Coated with Binder | | Coated | Coated | Coated |
| Whether or Not Particles of cBN Powder were Preliminarily Grinded | | Grinded | Grinded | Not Grinded |
| Conditions of Preliminary Grinding of Particles of cBN Powder | | Ball Mill 10 hr | Ball Mill 10 hr | — |
| Conditions of Mixing of Diamond Powder and cBN Powder | | Ball Mill 10 hr | Ball Mill 10 hr | Ball Mill 10 hr |
| Average Length (μm) of Line Segments Extending Across Continuous cBN Grains | | 0.5 | 0.9 | 3.3 |
| Average Length (Multiple) of Line Segments Extending Across Continuous cBN Grains with respect to Average Grain Size of cBN Grains | | 0.5 | 0.9 | 3.3 |
| Average Length (μm) of Line Segments Extending Across Diamond Grains or Across Diamond Grains and Adjacent Binder Phase | | 1.4 | 1.5 | 4.1 |
| Standard Deviation (μm) of Lengths of Line Segments Extending Across Diamond Grains or Across Diamond Grains and Adjacent Binder Phase | | 0.8 | 0.8 | 3.5 |
| Life (m) in Cutting Test | | 4.4 | 3.6 | 0.4 |
| Notes | | Example | Example | Comparative Example |

With reference to Table 1 and Table 2, as indicated in No. I-1 to No. I-4, No. I-6, No. I-7, and No. I-10 to No. I-15, the life (the length of cut of the workpiece when the flank wear and/or chipping width became more than 0.1 mm) of each of the cutting tools composed of the following composite sintered material was so long as to be 2.1 to 4.4 m: a composite sintered material including a plurality of diamond grains, a plurality of cubic boron nitride grains, and a remainder of a binder phase, wherein the binder phase includes cobalt, a content of the cubic boron nitride grains in the composite sintered material is more than or equal to 3 volume % and less than or equal to 40 volume %, and an average length of line segments extending across continuous cubic boron nitride grains in appropriately specified straight lines extending through the composite sintered material is less than or equal to a length three times as large as an average grain size of the cubic boron nitride grains. This meant that the above-described composite sintered material has high wear resistance and high breakage resistance.

In each of the composite sintered materials of No. I-5 and No. I-16, the average length of the line segments extending across continuous cubic boron nitride grains was not less than or equal to the length three times as large as the average grain size of the cubic boron nitride grains, with the result that the lives of the cutting tools were short. Moreover, in each of the composite sintered materials of No. I-8 and No. I-9, the content of the cubic boron nitride grains in the composite sintered material fell out of the range of more than or equal to 3 volume % and less than or equal to 40 volume %, with the result that the lives of the cutting tools were short.

Experiment Example II

For No. II-1 to No. II-7, composite sintered materials and cutting tools were produced in the same manner as in experiment example I except that compositions, contents, and production conditions were changed as shown in Table 3. It should be noted that in No. II-6, the particles of the diamond powder were not dispersed before coating the surface of each particle of the diamond powder with the binder. In No. II-7, the surface of each particle of the diamond powder was not coated with the binder. A life evaluation test for the produced cutting tools was performed in the same manner as in experiment example I except that the following cutting conditions were employed: a cutting speed Vc was 600 m/min; a feed rate f was 0.15 mm/cutting edge; a depth of cut ap was 0.5 mm; a radial depth of cut ae was 0.12 mm; and coolant was WET (20×-diluted emulsion). Results thereof are collectively shown in Table 3.

TABLE 3

| No. | | II-1 | II-2 | II-3 | II-4 | II-5 | II-6 | II-7 |
|---|---|---|---|---|---|---|---|---|
| Diamond Grains | Average Grain Size (μm) | 0.8 | 1.2 | 2.0 | 0.5 | 2.0 | 0.8 | 0.8 |
| | Content (Volume %) | 75 | 79 | 80 | 70 | 83 | 75 | 75 |
| cBN Grains | Average Grain Size (μm) | 0.8 | 0.8 | 0.8 | 0.5 | 1.5 | 0.8 | 0.8 |
| | Content (Volume %) | 12 | 10 | 10 | 15 | 8 | 12 | 12 |
| Binder | Prepared Composition (Mass %) | Co: 100 | Co: 100 | Co: 100 | Co: 100 | Co: 100 | Co: 100 | Co: 100 |
| Binder Phase | Content (Volume %) | 13 | 11 | 10 | 15 | 9 | 13 | 13 |
| Other Grains and Contents (Volume %) | | — | — | — | — | — | — | — |
| Whether or Not Diamond Powder was Dispersed before Coating Each Particle with Binder | | Dispersed | Dispersed | Dispersed | Dispersed | Dispersed | Not Dispersed | Dispersed |
| Whether or Not Each Particle of Diamond Powder was Coated with Binder | | Coated | Coated | Coated | Coated | Coated | Coated | Not Coated |
| Whether or Not Particles of cBN Powder were Preliminarily Grinded | | Grinded | Grinded | Grinded | Grinded | Grinded | Grinded | Grinded |
| Conditions of Preliminary Grinding of Particles of cBN Powder | | Ball Mill 10 hr | Ball Mill 10 hr | Ball Mill 10 hr | Ball Mill 10 hr | Ball Mill 10 hr | Ball Mill 10 hr | Ball Mill 10 hr |
| Conditions of Mixing of Diamond Powder and cBN Powder | | Ball Mill 10 hr | Ball Mill 10 hr | Ball Mill 10 hr | Ball Mill 10 hr | Ball Mill 10 hr | Ball Mill 10 hr | Ball Mill 10 hr |
| Average Length (μm) of Line Segments Extending Across Continuous cBN Grains | | 0.6 | 0.7 | 0.6 | 0.3 | 1.2 | 0.5 | 0.6 |
| Average Length (Multiple) of Line Segments Extending Across Continuous cBN Grains with respect to Average Grain Size of cBN Grains | | 0.75 | 0.875 | 0.75 | 0.6 | 0.8 | 0.625 | 0.75 |
| Average Length (μm) of Line Segments Extending Across Diamond Grains or Across Diamond Grains and Adjacent Binder Phase | | 1.4 | 2.7 | 3.2 | 0.3 | 5.0 | 5.3 | 0.2 |
| Standard Deviation (μm) of Lengths of Line Segments Extending Across Diamond Grains or Across Diamond Grains and Adjacent Binder Phase | | 0.9 | 2.2 | 2.5 | 0.3 | 2.8 | 2.5 | 0.3 |
| Life (m) in Cutting Test | | 3.2 | 2.9 | 2.7 | 2.3 | 2.2 | 1.8 | 1.5 |
| Notes | | Example | Example | Example | Example | Example | Example | Example |

With reference to Table 3, as indicated in No. II-1 to No. II-5, the life of each of the cutting tools composed of the following composite sintered material was long: a composite sintered material including a plurality of diamond grains, a plurality of cubic boron nitride grains, and a remainder of a binder phase, wherein the binder phase includes cobalt, a content of the cubic boron nitride grains in the composite sintered material is more than or equal to 3 volume % and less than or equal to 40 volume %, an average length of line segments extending across continuous cubic boron nitride grains in appropriately specified straight lines extending through the composite sintered material is less than or equal to a length three times as large as an average grain size of the cubic boron nitride grains, and an average length of line segments extending across the diamond grains or across the diamond grains and the binder phase adjacent to the diamond grains in the appropriately specified straight lines extending through the composite sintered material is more than or equal to 0.3 µm and less than or equal to 5 µm.

Experiment Example III

For No. III-1 to No. III-9, composite sintered materials and cutting tools were produced in the same manner as in experiment example I except that compositions, contents, and production conditions were changed as shown in Table 4. A life evaluation test for the produced cutting tools was performed in the same manner as in experiment example I except that: the upper surface of a workpiece of a square plate-like Ti-6Al-4V alloy of 150 mm×150 mm (ASTM B348 Grade 5 provided by UMETOKU Inc.) was cut; and cutting was performed under conditions that a cutting speed Vc was 800 m/min, a feed rate f was 0.15 mm/cutting edge, a depth of cut ap was 0.5 mm, a radial depth of cut ae was 0.12 mm, and coolant was Bluebe pure oil with an MQL of 2 cm³/h. Results thereof are shown in Table 4.

TABLE 4

| No. | | | III-1 | III-2 | III-3 | III-4 | III-5 |
|---|---|---|---|---|---|---|---|
| Diamond Grains | Average Grain Size (µm) | | 1.0 | 1.0 | 1.0 | 1.0 | 1.0 |
| | Content (Volume %) | | 65 | 65 | 65 | 65 | 65 |
| cBN Grains | Average Grain Size (µm) | | 0.8 | 0.8 | 0.8 | 0.8 | 0.1 |
| | Content (Volume %) | | 20 | 20 | 20 | 20 | 20 |
| Binder | Prepared Composition (Mass %) | | Co: 100 | Co: 100 | Co: 100 | Co: 100 | Co: 100 |
| Binder Phase | Content (Volume %) | | 15 | 15 | 15 | 15 | 15 |
| Other Grains and Contents (Volume %) | | | — | — | — | — | — |
| Whether or Not Diamond Powder was Dispersed before Coating Each Particle with Binder | | | Dispersed | Dispersed | Dispersed | Dispersed | Dispersed |
| Whether or Not Each Particle of Diamond Powder was Coated with Binder | | | Coated | Coated | Coated | Coated | Coated |
| Whether or Not Particles of cBN Powder were Preliminarily Grinded | | | Grinded | Grinded | Grinded | Grinded | Grinded |
| Conditions of Preliminary Grinding of Particles of cBN Powder | | | Ball Mill 10 hr | Ball Mill 10 hr | Ball Mill 10 hr | Ball Mill 10 hr | Ball Mill 10 hr |
| Conditions of Mixing of Diamond Powder and cBN Powder | | | Ball Mill 20 hr | Ball Mill 10 hr | Ball Mill 5 hr | Ball Mill 3 hr | Ball Mill 10 hr |
| Average Length (µm) of Line Segments Extending Across Continuous cBN Grains | | | 0.5 | 0.6 | 0.5 | 0.6 | 0.3 |
| Average Length (Multiple) of Line Segments Extending Across Continuous cBN Grains with respect to Average Grain Size of cBN Grains | | | 0.625 | 0.75 | 0.625 | 0.75 | 3.0 |
| Average Length (µm) of Line Segments Extending Across Diamond Grains or Across Diamond Grains and Adjacent Binder Phase | | | 1.3 | 2.1 | 2.4 | 3.5 | 0.4 |
| Standard Deviation (µm) of Lengths of Line Segments Extending Across Diamond Grains or Across Diamond Grains and Adjacent Binder Phase | | | 0.5 | 1.5 | 2.8 | 3.3 | 0.2 |
| Life (m) in Cutting Test | | | 278 | 255 | 233 | 192 | 168 |
| Notes | | | Example | Example | Example | Example | Example |

| No. | | | III-6 | III-7 | III-8 | III-9 |
|---|---|---|---|---|---|---|
| Diamond Grains | Average Grain Size (µm) | | 1.0 | 0.3 | 7.0 | 1.0 |
| | Content (Volume %) | | 65 | 65 | 65 | 65 |
| cBN Grains | Average Grain Size (µm) | | 3.0 | 0.5 | 2.0 | 1 |
| | Content (Volume %) | | 20 | 20 | 20 | 20 |
| Binder | Prepared Composition (Mass %) | | Co: 100 | Co: 100 | Co: 100 | Co: 100 |
| Binder Phase | Content (Volume %) | | 15 | 15 | 15 | 15 |
| Other Grains and Contents (Volume %) | | | — | — | — | — |
| Whether or Not Diamond Powder was Dispersed before Coating Each Particle with Binder | | | Dispersed | Dispersed | Dispersed | Dispersed |
| Whether or Not Each Particle of Diamond Powder was Coated with Binder | | | Coated | Coated | Coated | Coated |
| Whether or Not Particles of cBN Powder were Preliminarily Grinded | | | Grinded | Grinded | Grinded | Not Grinded |
| Conditions of Preliminary Grinding of Particles of cBN Powder | | | Ball Mill 10 hr | Ball Mill 10 hr | Ball Mill 10 hr | — |
| Conditions of Mixing of Diamond Powder and cBN Powder | | | Ball Mill 10 hr | Ball Mill 10 hr | Ball Mill 10 hr | Ball Mill 10 hr |
| Average Length (µm) of Line Segments Extending Across Continuous cBN Grains | | | 1.5 | 0.3 | 0.9 | 3.8 |

TABLE 4-continued

| | | | | |
|---|---|---|---|---|
| Average Length (Multiple) of Line Segments Extending Across Continuous cBN Grains with respect to Average Grain Size of cBN Grains | 0.5 | 0.6 | 0.45 | 3.8 |
| Average Length (μm) of Line Segments Extending Across Diamond Grains or Across Diamond Grains and Adjacent Binder Phase | 2.8 | 0.8 | 4.2 | 4.1 |
| Standard Deviation (μm) of Lengths of Line Segments Extending Across Diamond Grains or Across Diamond Grains and Adjacent Binder Phase | 1.2 | 0.3 | 2.8 | 4.2 |
| Life (m) in Cutting Test | 161 | 184 | 156 | 10.2 |
| Notes | Example | Example | Example | Comparative Example |

With reference to Table 4, as indicated in No. III-1 to No. III-8, the life of each of the cutting tools composed of the following composite sintered material was long: a composite sintered material including a plurality of diamond grains, a plurality of cubic boron nitride grains, and a remainder of a binder phase, wherein the binder phase includes cobalt, a content of the cubic boron nitride grains in the composite sintered material is more than or equal to 3 volume % and less than or equal to 40 volume %, an average length of line segments extending across continuous cubic boron nitride grains in appropriately specified straight lines extending through the composite sintered material is less than or equal to a length three times as large as an average grain size of the cubic boron nitride grains, and an average length of line segments extending across the diamond grains or across the diamond grains and the binder phase adjacent to the diamond grains in the appropriately specified straight lines extending through the composite sintered material is more than or equal to 0.3 μm and less than or equal to 5 μm.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:

1. A composite sintered material comprising a plurality of diamond grains, a plurality of cubic boron nitride grains, and a remainder of a binder phase, wherein
the binder phase includes cobalt,
a content of the cubic boron nitride grains in the composite sintered material is more than or equal to 3 volume % and less than or equal to 40 volume %, and
an average length of line segments extending across continuous cubic boron nitride grains in appropriately specified straight lines extending through the composite sintered material is less than or equal to a length three times as large as an average grain size of the cubic boron nitride grains.

2. The composite sintered material according to claim 1, wherein an average length of line segments extending across the diamond grains or across the diamond grains and the binder phase adjacent to the diamond grains in the appropriately specified straight lines extending through the composite sintered material is more than or equal to 0.3 μm and less than or equal to 5 μm.

3. The composite sintered material according to claim 1, wherein a standard deviation of lengths of line segments extending across the diamond grains or across the diamond grains and the binder phase adjacent to the diamond grains in the appropriately specified straight lines extending through the composite sintered material is less than or equal to 3.0 μm.

4. The composite sintered material according to claim 1, wherein the average grain size of the cubic boron nitride grains is more than or equal to 0.2 μm and less than or equal to 2 μm.

5. The composite sintered material according to claim 1, wherein an average grain size of the diamond grains is more than or equal to 0.5 μm and less than or equal to 5 μm.

6. A composite sintered material comprising a plurality of diamond grains, a plurality of cubic boron nitride grains, and a remainder of a binder phase, wherein
the binder phase includes cobalt,
a content of the cubic boron nitride grains in the composite sintered material is more than or equal to 3 volume % and less than or equal to 40 volume %,
an average length of line segments extending across continuous cubic boron nitride grains in appropriately specified straight lines extending through the composite sintered material is less than or equal to a length three times as large as an average grain size of the cubic boron nitride grains,
an average length of line segments extending across the diamond grains or across the diamond grains and the binder phase adjacent to the diamond grains in the appropriately specified straight lines extending through the composite sintered material is more than or equal to 0.3 μm and less than or equal to 5 μm, and a standard deviation of the line segments extending across the diamond grains or across the diamond grains and the binder phase adjacent to the diamond grains in the appropriately specified straight lines extending through the composite sintered material is less than or equal to 3.0 μm,
the average grain size of the cubic boron nitride grains is more than or equal to 0.2 μm and less than or equal to 2 μm, and
an average grain size of the diamond grains is more than or equal to 0.5 μm and less than or equal to 5 μm.

* * * * *